(12) United States Patent
Wu et al.

(10) Patent No.: US 11,827,521 B2
(45) Date of Patent: Nov. 28, 2023

(54) METHOD FOR SELECTIVELY CHEMICALLY REDUCING CO₂ TO FORM CO

(71) Applicant: INDUSTRIAL TECHNOLOGY RESEARCH INSTITUTE, Hsinchu (TW)

(72) Inventors: Kuo-Ching Wu, Lieyu Township (TW); Hsi-Yen Hsu, Hsinchu (TW); Chao-Huang Chen, Hsinchu (TW); Yuan-Peng Du, Hsinchu (TW)

(73) Assignee: INDUSTRIAL TECHNOLOGY RESEARCH INSTITUTE, Hsinchu (TW)

(*) Notice: Subject to any disclaimer, the term of this patent is extended or adjusted under 35 U.S.C. 154(b) by 9 days.

(21) Appl. No.: 17/550,895

(22) Filed: Dec. 14, 2021

(65) Prior Publication Data

US 2023/0183074 A1 Jun. 15, 2023

(51) Int. Cl.
| | | |
|---|---|---|
| *C01B 32/40* | (2017.01) | |
| *B01J 21/06* | (2006.01) | |
| *B01J 21/04* | (2006.01) | |
| *B01J 23/00* | (2006.01) | |
| *B01J 23/889* | (2006.01) | |
| *B01J 29/08* | (2006.01) | |

(52) U.S. Cl.
CPC ............ *C01B 32/40* (2017.08); *B01J 21/04* (2013.01); *B01J 21/063* (2013.01); *B01J 21/066* (2013.01); *B01J 23/002* (2013.01); *B01J 23/8892* (2013.01); *B01J 29/084* (2013.01)

(58) Field of Classification Search
CPC ......... C01B 32/40; B01J 21/04; B01J 21/063; B01J 21/066; B01J 23/002; B01J 23/8892; B01J 29/084
See application file for complete search history.

(56) References Cited

U.S. PATENT DOCUMENTS

| | | |
|---|---|---|
| 7,261,868 B2 | 8/2007 | Kanno et al. |
| 7,294,315 B1 | 11/2007 | Kanno et al. |
| 7,438,889 B2 | 10/2008 | Pez et al. |
| 7,767,611 B2 | 8/2010 | Luo et al. |
| 8,716,163 B2 | 5/2014 | Liu et al. |
| 8,961,829 B2 | 2/2015 | Mamedov et al. |
| 9,546,118 B2 | 1/2017 | Miao et al. |
| 2006/0088469 A1 | 4/2006 | Perez-Ramirez |
| 2009/0264693 A1 | 10/2009 | Xie et al. |
| 2010/0190874 A1 | 7/2010 | Mamedov et al. |
| 2011/0105630 A1* | 5/2011 | Dorner ............... B01J 23/8892 518/700 |
| 2013/0034478 A1 | 2/2013 | Doty |
| 2016/0296916 A1 | 10/2016 | Kim et al. |
| 2018/0015444 A1 | 1/2018 | Porosoff et al. |
| 2018/0093888 A1 | 4/2018 | Mamedov et al. |
| 2019/0329227 A1 | 10/2019 | Porosoff et al. |
| 2020/0139351 A1 | 5/2020 | Kuhn et al. |
| 2020/0406246 A1 | 12/2020 | Álvarez Galván et al. |

FOREIGN PATENT DOCUMENTS

| | | |
|---|---|---|
| CA | 3 030 838 A1 | 1/2018 |
| CN | 1880414 A | 12/2006 |
| CN | 102838116 A | 12/2012 |
| CN | 103183346 A | 7/2013 |
| CN | 103230799 A | 8/2013 |
| CN | 101678329 B | 9/2013 |
| CN | 103418392 A | 12/2013 |
| CN | 105854914 A | 8/2016 |
| CN | 106268893 A | 1/2017 |
| CN | 104302575 B | 3/2017 |
| CN | 106732743 A | 5/2017 |
| CN | 106881082 A | 6/2017 |
| CN | 107051573 A | 8/2017 |
| CN | 107497439 A | 12/2017 |
| CN | 107500296 A | 12/2017 |
| CN | 107530683 A | 1/2018 |
| CN | 107570162 A | 1/2018 |
| CN | 107649157 A | 2/2018 |
| CN | 106881084 B | 4/2019 |
| CN | 110756197 A | 2/2020 |
| CN | 111924891 A | 11/2020 |
| EA | 200901458 A1 | 4/2010 |
| EA | 016492 B1 | 5/2012 |

(Continued)

OTHER PUBLICATIONS

Ma et al (Spinel-Structured Ternary Ferrites as Effective Agents for Chemical Looping CO2 Splitting, Industrial and Engineering Chemistry Research, 2020) (Year: 2020).*

Yan et al., "Tuning $CO_2$ hydrogenation selectivity via metal-oxide interfacial sites", Elsevier, Journal of Catalysis, vol. 374, 2019, pp. 60-71.

Yang et al., "Synergy between Ceria Oxygen Vacancies and Cu Nanoparticles Facilitates the Catalytic Conversion of $CO_2$ to CO under Mild Conditions", ACS Catalysis, vol. 8, 2018, pp. 12056-12066.

(Continued)

*Primary Examiner* — Colin W. Slifka
*Assistant Examiner* — Logan Edward Laclair
(74) *Attorney, Agent, or Firm* — Birch, Stewart, Kolasch & Birch, LLP

(57) ABSTRACT

A method for selectively chemically reducing $CO_2$ to form CO includes providing a catalyst, and contacting $H_2$ and $CO_2$ with the catalyst to chemically reduce $CO_2$ to form CO. The catalyst includes a metal oxide having a chemical formula of $Fe_xCo_yMn_{(1-x-y)}O_z$, in which $0.7 \le x \le 0.95$, $0.01 \le y \le 0.25$, and z is an oxidation coordination number.

4 Claims, No Drawings

(56) References Cited

FOREIGN PATENT DOCUMENTS

| | | |
|---|---|---|
| EP | 3 375 513 A1 | 9/2018 |
| FR | 3 063 917 A1 | 9/2018 |
| KR | 10-2015-0049186 A | 5/2015 |
| KR | 10-2018-0004165 A | 1/2018 |
| KR | 10-1864602 B1 | 6/2018 |
| RU | 2017 140 846 A | 5/2019 |
| TW | I308590 B | 4/2009 |
| WO | WO 2008/115933 A1 | 9/2008 |
| WO | WO 2008/131898 A1 | 11/2008 |
| WO | WO 2016/176105 A1 | 11/2016 |
| WO | WO 2017/074843 A1 | 5/2017 |
| WO | WO 2017/085593 A2 | 5/2017 |
| WO | WO 2017/085594 A2 | 5/2017 |
| WO | WO 2018/013263 A1 | 1/2018 |
| WO | WO 2018/122439 A1 | 7/2018 |
| WO | WO 2018/222749 A1 | 12/2018 |

OTHER PUBLICATIONS

Taiwanese Notice Of Allowance and Search Report for Taiwanese Application No. 110146665, dated Aug. 1, 2022.

\* cited by examiner

METHOD FOR SELECTIVELY CHEMICALLY REDUCING CO₂ TO FORM CO

TECHNICAL FIELD

The technical field relates to a process of selectively chemically reducing $CO_2$ to CO, and in particular it relates to a catalyst for the process.

BACKGROUND

Global warming makes the application of $CO_2$ attracts more attention. The conversion ratio of $CO_2$ into methane and methanol is not high due to thermodynamic limitation. However, if $CO_2$ is converted to CO first, and then converted to other hydrocarbon compounds (e.g. in an FT reaction), the conversion ratio can be dramatically enhanced. CO is a critical building block and a raw material used in chemical engineering, and its global production value is about 5,870 million U.S. dollars. CO is usually used to produce acetic acid, OXO alcohol, and the like. The acetic acid production in Taiwan is 750,000 tons per year, and the annual demand for CO exceeds hundreds of thousands of tons per year.

In general, $CO_2$ can be chemically reduced into CO using a reverse water gas shift reaction (e.g. $H_2 + CO_2 \rightarrow CO + H_2O$) with a heat of reaction of 41.2 kJ/mole. As such, high temperature is beneficial to the reverse water gas shift reaction, and low temperature is beneficial to the water gas shift reaction. The water gas shift reaction (e.g. $CO + H_2O \rightarrow CO_2 + H_2$) has a heat of reaction of −41.2 kJ/mole. However, a methanation reaction also occurs between $H_2$ and $CO_2$. The methanation reaction (e.g. $4H_2 + CO_2 \rightarrow CH_4 + 2H_2O$) has a heat of reaction of −165 kJ/mole. As known from thermodynamics, low temperature is beneficial to the water gas shift reaction and the methanation reaction. The conventional method for chemically reducing $CO_2$ to CO is performed at a high temperature (e.g. 600° C.) with a low selectivity. For example, the product includes a high concentration of methane to be further separated, thereby increasing the cost of manufacturing CO.

Accordingly, a novel catalyst for selectively chemically reducing $CO_2$ to CO at low temperatures and lowering the $CH_4$ content in the CO product is called for.

SUMMARY

One embodiment of the disclosure provides a catalyst for selectively chemically reducing $CO_2$ to form CO, including a metal oxide having a chemical formula of $Fe_xCo_yMn_{(1-x-y)}O_z$, wherein $0.7 \leq x \leq 0.95$, $0.01 \leq y \leq 0.25$, and z is an oxidation coordination number.

One embodiment of the disclosure provides a method for selectively chemically reducing $CO_2$ to form CO, including providing the described catalyst; and contacting $H_2$ and $CO_2$ with the catalyst to chemically reduce $CO_2$ to form CO.

A detailed description is given in the following embodiments.

DETAILED DESCRIPTION

In the following detailed description, for purposes of explanation, numerous specific details are set forth in order to provide a thorough understanding of the disclosed embodiments. It will be apparent, however, that one or more embodiments may be practiced without these specific details.

One embodiment of the disclosure provides a catalyst for selectively chemically reducing $CO_2$ to form CO, including a metal oxide having a chemical formula of $Fe_xCo_yMn_{(1-x-y)}O_z$, wherein $0.7 \leq x \leq 0.95$, $0.01 \leq y \leq 0.25$, and z is an oxidation coordination number. If the Fe amount is too high or too low, the conversion efficiency of $CO_2$ will be insufficient, or the effect of selectively converting $CO_2$ to CO will be poor (e.g. the $CH_4$ content in the product will be too much). If the Co amount is too high or too low, the conversion efficiency of $CO_2$ will be insufficient, or the effect of selectively converting $CO_2$ to CO will be poor (e.g. the $CH_4$ content in the product will be too much). If the Mn amount is too high or too low, the conversion efficiency of $CO_2$ will be insufficient, or the effect of selectively converting $CO_2$ to CO will be poor (e.g. the $CH_4$ content in the product will be too much).

In some embodiments, the catalyst further includes a support, and the metal oxide is loaded on the support. For example, the support can be zirconium oxide, titanium oxide, silicon oxide, zeolite, aluminum oxide, another suitable support, or a combination thereof. In some embodiments, the metal oxide and the support have a weight ratio of 1:0.01 to 1:9. If the amount of the support is too high, the metal oxide amount will be too low to provide a sufficient conversion efficiency of $CO_2$.

One embodiment of the disclosure provides a method for selectively chemically reducing $CO_2$ to form CO, including providing the described catalyst; and contacting $H_2$ and $CO_2$ with the catalyst to chemically reduce $CO_2$ to form CO. In some embodiments, the step of contacting $H_2$ and $CO_2$ with the catalyst is performed at a temperature of 200° C. to 500° C. If the temperature of the step is too low, the conversion efficiency of $CO_2$ will be insufficient or even no conversion. If the temperature of the step is too high, the energy consumption will be increased to enhance the carbon emission. In some embodiments, the step of contacting $H_2$ and $CO_2$ with the catalyst is performed at a pressure of 1 bar to 40 bar. If the pressure of the step is too low, the throughput will be insufficient and therefore unsuitable for industrialization. If the pressure of the step is too high, the energy consumption will be increased to enhance the carbon emission. In some embodiments, $H_2$ and $CO_2$ have a molar ratio of 16:1 to 1:4. If the $H_2$ amount is too high, the selectivity of CO in the product will be lowered (e.g. the yield of $CH_4$ will be increased). If the $H_2$ amount is too low, $CO_2$ cannot be efficiently converted.

Note that in the metal oxide of the catalyst in the disclosure, the metal elements such as Fe, Co, and Mn cannot be arbitrarily replaced with another element. For example, if Co is replaced with Cu, the catalyst fails to chemically reduce $CO_2$ to CO at a low temperature (such as ≤500° C., or even ≤400° C.) with a high selectivity.

Accordingly, the catalyst in the disclosure may efficiently convert $CO_2$ at low temperatures, such as by selectively chemically reducing $CO_2$ to CO without forming $CH_4$. Compared to the conventional process of chemically reducing $CO_2$ to CO, the process in the disclosure is performed at a lower temperature (such as lower than 300° C.) with a higher selectivity of CO, thereby efficiently lowering the energy consumption of the process and reducing the separation cost (e.g. for separating CO and $CH_4$).

Below, exemplary embodiments will be described in detail so as to be easily realized by a person having ordinary knowledge in the art. The inventive concept may be embodied in various forms without being limited to the exemplary embodiments set forth herein. Descriptions of well-known

EXAMPLES

Preparation Example 1 ($Fe_{0.8}Co_{0.1}Mn_{0.1}O_z$)

Iron nitrate (0.8 mol), cobalt nitrate (0.1 mol), and manganese nitrate (0.1 mol) were put into a beaker, and water (200 mL) was added into the beaker and stirred at room temperature to dissolve the salts. The pH value of the solution was adjusted to be neutral. The neutralized solution was stirred for 2 hours, and then directly heated to 110° C. to be dried. The dried solid was heated to 450° C. to be sintered for 4 hours, thereby obtaining a metal oxide catalyst $Fe_{0.8}Co_{0.1}Mn_{0.1}O_z$, and z was an oxidation coordination number.

Preparation Example 2 ($Fe_{0.8}Co_{0.1}Mn_{0.1}O_z$)

Cobalt nitrate (0.1 mol) and manganese nitrate (0.1 mol) were put into a beaker, and water (200 mL) was added into the beaker and stirred at room temperature to dissolve the salts. The pH value of the solution was adjusted to be neutral. Iron hydroxide (0.8 mol) was added to the neutralized solution, and then stirred to be evenly mixed. The mixture was stirred for 2 hours, and then directly heated to 110° C. to be dried. The dried solid was heated to 450° C. to be sintered for 4 hours, thereby obtaining a metal oxide catalyst $Fe_{0.8}Co_{0.1}Mn_{0.1}O_z$, and z was an oxidation coordination number.

Preparation Example 3 ($Fe_{0.7}Co_{0.2}Mn_{0.1}O_z$)

Iron nitrate (0.7 mol), cobalt nitrate (0.2 mol), and manganese nitrate (0.1 mol) were put into a beaker, and water (200 mL) was added into the beaker and stirred at room temperature to dissolve the salts. The pH value of the solution was adjusted to be neutral. The neutralized solution was stirred for 2 hours, and then directly heated to 110° C. to be dried. The dried solid was heated to 450° C. to be sintered for 4 hours, thereby obtaining a metal oxide catalyst $Fe_{0.7}CO_{0.2}Mn_{0.1}O_z$, and z was an oxidation coordination number.

Preparation Example 4 ($Fe_{0.9}Co_{0.01}Mn_{0.09}O_z$)

Iron nitrate (0.9 mol), cobalt nitrate (0.01 mol), and manganese nitrate (0.09 mol) were put into a beaker, and water (200 mL) was added into the beaker and stirred at room temperature to dissolve the salts. The pH value of the solution was adjusted to be neutral. The neutralized solution was stirred for 2 hours, and then directly heated to 110° C. to be dried. The dried solid was heated to 450° C. to be sintered for 4 hours, thereby obtaining a metal oxide catalyst $Fe_{0.9}Co_{0.01}Mn_{0.09}O_z$, and z was an oxidation coordination number.

Comparative Preparation Example 1 ($Fe_{0.5}Co_{0.4}Mn_{0.1}O_z$)

Iron nitrate (0.5 mol), cobalt nitrate (0.4 mol), and manganese nitrate (0.1 mol) were put into a beaker, and water (200 mL) was added into the beaker and stirred at room temperature to dissolve the salts. The pH value of the solution was adjusted to be neutral. The neutralized solution was stirred for 2 hours, and then directly heated to 110° C. to be dried. The dried solid was heated to 450° C. to be sintered for 4 hours, thereby obtaining a metal oxide catalyst $Fe_{0.5}Co_{0.4}Mn_{0.1}O_z$, and z was an oxidation coordination number.

Comparative Preparation Example 2 ($Fe_{0.8}Co_{0.2}O_z$)

Cobalt nitrate (0.2 mol) was put into a beaker, and water (200 mL) was added into the beaker and stirred at room temperature to dissolve the salt. The pH value of the solution was adjusted to be neutral. Iron hydroxide (0.8 mol) was added to the neutralized solution, and then stirred to be evenly mixed. The mixture was stirred for 2 hours, and then directly heated to 110° C. to be dried. The dried solid was heated to 450° C. to be sintered for 4 hours, thereby obtaining a metal oxide catalyst $Fe_{0.8}Co_{0.2}O_z$, and z was an oxidation coordination number.

Comparative Preparation Example 3 ($Fe_{0.8}Cu_{0.1}Mn_{0.1}O_z$)

Iron nitrate (0.8 mol), copper nitrate (0.1 mol), and manganese nitrate (0.1 mol) were put into a beaker, and water (200 mL) was added into the beaker and stirred at room temperature to dissolve the salts. The pH value of the solution was adjusted to be neutral. The neutralized solution was stirred for 2 hours, and then directly heated to 110° C. to be dried. The dried solid was heated to 450° C. to be sintered for 4 hours, thereby obtaining a metal oxide catalyst $Fe_{0.8}Cu_{0.1}Mn_{0.1}O_z$, and z was an oxidation coordination number.

Comparative Preparation Example 4 ($Fe_{0.8}Mn_{0.2}O_z$)

Manganese nitrate (0.2 mol) were put into a beaker, and water (200 mL) was added into the beaker and stirred at room temperature to dissolve the salt. The pH value of the solution was adjusted to be neutral. Iron hydroxide (0.8 mol, Alfa) was added to the neutralized solution, and then stirred to be evenly mixed. The mixture was stirred for 2 hours, and then directly heated to 110° C. to be dried. The dried solid was heated to 450° C. to be sintered for 4 hours, thereby obtaining a metal oxide catalyst $Fe_{0.8}Mn_{0.2}O_z$, and z was an oxidation coordination number.

Example 1

The metal oxide catalyst $Fe_{0.8}Co_{0.1}Mn_{0.1}O_z$ (20-30 mesh, 6 mL) in Preparation Example 1 was filled in a column. Hydrogen and carbon dioxide (GHSV was 800 to 1200 $h^{-1}$) were introduced through the column to contact the metal oxide catalyst. The column temperature was controlled to continuously react for 60 minutes, and the product composition was then verified by gas chromatography (with the carbonxen-1010 plot column), as shown in Table 1. As shown in Table 1, the $CO_2$ conversion ratio at a low temperature (300° C.) of the metal oxide catalyst in Preparation Example 1 was close to the theoretical value, and the selectivity of CO in the product was very high.

Example 2

Example 2 was similar to Example 1, and the difference in Example 2 was the metal oxide catalyst being replaced with the metal oxide catalyst $Fe_{0.8}Co_{0.1}Mn_{0.1}O_z$ in Preparation Example 2. The methods of controlling the reaction conditions and analyzing the product were similar to those in Example 1, and the results are shown in Table 1. As shown in Table 1, the $CO_2$ conversion ratio at a low temperature (300° C.) of the metal oxide catalyst prepared by the different preparation condition was close to the theoretical value, and the selectivity of CO in the product was very high.

Example 3

Example 3 was similar to Example 1, and the difference in Example 3 was the metal oxide catalyst being replaced with the metal oxide catalyst $Fe_{0.7}Co_{0.2}Mn_{0.1}O_z$ in Preparation Example 3. The methods of controlling the reaction conditions and analyzing the product were similar to those in Example 1, and the results are shown in Table 1. As shown in Table 1, the $CO_2$ conversion ratio at a low temperature (300° C.) of the metal oxide catalyst $Fe_{0.7}Co_{0.2}Mn_{0.1}O_z$ was close to the theoretical value, and the selectivity of CO in the product was very high.

Example 4

Example 4 was similar to Example 1, and the difference in Example 4 was the metal oxide catalyst being replaced with the metal oxide catalyst $Fe_{0.9}Co_{0.01}Mn_{0.09}O_z$ in Preparation Example 4. The methods of controlling the reaction conditions and analyzing the product were similar to those in Example 1, and the results are shown in Table 1. As shown in Table 1, the $CO_2$ conversion ratio at a low temperature (400° C.) of the metal oxide catalyst $Fe_{0.9}Co_{0.01}Mn_{0.09}O_z$ was close to the theoretical value, and the selectivity of CO in the product was very high.

Comparative Example 1

Comparative Example 1 was similar to Example 1, and the difference in Comparative Example 1 was the metal oxide catalyst being replaced with the metal oxide catalyst $Fe_{0.5}Co_{0.4}Mn_{0.1}O_z$ in Comparative Preparation Example 1. The methods of controlling the reaction conditions and analyzing the product were similar to those in Example 1, and the results are shown in Table 1. As shown in Table 1, the $CO_2$ conversion ratio at a low temperature (300° C.) of the metal oxide catalyst $Fe_{0.5}Co_{0.4}Mn_{0.1}O_z$ was too low, and the selectivity of CO in the product was low. Accordingly, the metal oxide catalyst with too little Fe and too much Co was ineffective to selectively chemically reduce $CO_2$ to CO at a low temperature.

Comparative Example 2

Comparative Example 2 was similar to Example 1, and the difference in Comparative Example 2 was the metal oxide catalyst being replaced with the metal oxide catalyst $Fe_{0.8}Co_{0.2}O_z$ in Comparative Preparation Example 2. The methods of controlling the reaction conditions and analyzing the product were similar to those in Example 1, and the results are shown in Table 1. As shown in Table 1, the $CO_2$ conversion ratio at a low temperature (300° C.) of the metal oxide catalyst $Fe_{0.8}Co_{0.2}O_z$ was too low, and the selectivity of CO in the product was low. Accordingly, the metal oxide catalyst without Mn was ineffective to selectively chemically reduce $CO_2$ to CO at a low temperature.

Comparative Example 3

Comparative Example 3 was similar to Example 1, and the difference in Comparative Example 3 was the metal oxide catalyst being replaced with the metal oxide catalyst $Fe_{0.8}Cu_{0.1}Mn_{0.1}O_z$ in Comparative Preparation Example 3. The methods of controlling the reaction conditions and analyzing the product were similar to those in Example 1, and the results are shown in Table 1. As shown in Table 1, the $CO_2$ conversion ratio at a low temperature (300° C.) of the metal oxide catalyst $Fe_{0.8}Cu_{0.1}Mn_{0.1}O_z$ was too low, and the product still contained a little $CH_4$. Accordingly, if Co of the metal oxide catalyst $Fe_{0.8}Co_{0.1}Mn_{0.1}O_z$ was replaced with Cu, the metal oxide catalyst was ineffective to selectively chemically reduce $CO_2$ to CO at a low temperature.

Comparative Example 4

Comparative Example 4 was similar to Example 1, and the difference in Comparative Example 4 was the metal oxide catalyst being replaced with iron hydroxide. The methods of controlling the reaction conditions and analyzing the product were similar to those in Example 1, and the results are shown in Table 1. As shown in Table 1, the $CO_2$ conversion ratio at a low temperature (400° C.) of iron hydroxide was too low, and the product contained a lot of $CH_4$. Accordingly, iron hydroxide was ineffective to selectively chemically reduce $CO_2$ to CO at a low temperature.

Comparative Example 5

Comparative Example 5 was similar to Example 1, and the difference in Comparative Example 5 was the metal oxide catalyst being replaced with the metal oxide catalyst $Fe_{0.8}Mn_{0.2}O_z$ in Comparative Preparation Example 4. The methods of controlling the reaction conditions and analyzing the product were similar to those in Example 1, and the results are shown in Table 1. As shown in Table 1, the $CO_2$ conversion ratio at a low temperature (400° C.) of the metal oxide catalyst $Fe_{0.8}Mn_{0.2}O_z$ was too low. Accordingly, the metal oxide catalyst $Fe_{0.8}Mn_{0.2}O_z$ was ineffective to selectively chemically reduce $CO_2$ to CO at a low temperature.

TABLE 1

| | Metal oxide catalyst | $H_2$/CO | Reaction temperature (° C.) | Reaction pressure (bar) | Theoretical equilibrium conversion ratio (%, based on $CO_2$) | $CO_2$ conversion ratio (%) | Selectivity (%) CO | CH4 |
|---|---|---|---|---|---|---|---|---|
| Example 1 | Preparation Example 1 ($Fe_{0.8}Co_{0.1}Mn_{0.1}O_z$) | 1 | 200 | 10 | 6.1 | 3.23 | 100 | ND |
| | | | 250 | | 9.6 | 7.16 | 100 | ND |
| | | | 300 | | 13.6 | 13.19 | 100 | ND |
| Example 2 | Preparation Example 2 ($Fe_{0.8}Co_{0.1}Mn_{0.1}O_z$) | 2 | 250 | 1 | 13.4 | 10.2 | 100 | ND |
| | | | 300 | | 19.0 | 19.0 | 100 | ND |

TABLE 1-continued

| | Metal oxide catalyst | $H_2/CO$ | Reaction temperature (° C.) | Reaction pressure (bar) | Theoretical equilibrium conversion ratio (%, based on $CO_2$) | $CO_2$ conversion ratio (%) | Selectivity (%) CO | Selectivity (%) $CH_4$ |
|---|---|---|---|---|---|---|---|---|
| Example 3 | Preparation Example 3 ($Fe_{0.7}Co_{0.2}Mn_{0.1}O_z$) | 2 | 200 | 1 | 8.6 | 5.4 | 100 | ND |
| | | | 300 | | 19.0 | 17.4 | 100 | ND |
| | | | 400 | | 31.1 | 30.1 | 100 | ND |
| Example 4 | Preparation Example 4 $Fe_{0.9}Co_{0.01}Mn_{0.09}O_z$ | 2 | 400 | 1 | 31.1 | 29.2 | 100 | ND |
| | | | 500 | | 42.5 | 41.9 | 100 | ND |
| Comparative Example 1 | Comparative Preparation Example 1 ($Fe_{0.5}Co_{0.4}Mn_{0.1}O_z$) | 1 | 250 | 1 | 9.6 | 3.8 | 85.4 | 14.6 |
| | | | 300 | | 13.6 | 10.9 | 32.4 | 67.6 |
| Comparative Example 2 | Comparative Preparation Example 2 ($Fe_{0.8}Co_{0.2}O_z$) | 1 | 300 | 1 | 13.6 | 4.87 | 78.2 | 21.8 |
| | | | | 5 | 13.6 | 7.85 | 43.3 | 56.7 |
| | | | | 10 | 13.6 | 9.77 | 26.3 | 73.7 |
| Comparative Example 3 | Comparative Preparation Example 3 ($Fe_{0.8}Cu_{0.1}Mn_{0.1}O_z$) | 2 | 250 | 1 | 13.4 | 5.0 | 86.3 | 13.7 |
| | | | 300 | | 19.0 | 10.8 | 97.6 | 2.4 |
| Comparative Example 4 | Iron hydroxide | 2 | 300 | 1 | 19.0 | 2.5 | 87.4 | 12.6 |
| | | | 400 | | 31.1 | 4.3 | 87.9 | 12.1 |
| Comparative Example 5 | Comparative Preparation Example 4 ($Fe_{0.8}Mn_{0.2}O_z$) | 2 | 300 | 1 | 19.0 | 3.4 | 100 | ND |
| | | | 400 | | 31.1 | 7.8 | 100 | ND |

ND: Not detected

Preparation Example 5 ($Fe_{0.8}Co_{0.1}Mn_{0.1}O_z/ZrO_2$)

Iron nitrate (0.8 mol), cobalt nitrate (0.1 mol), and manganese nitrate (0.1 mol) were put into a beaker, and water (200 mL) was added into the beaker and stirred at room temperature to dissolve the salts. The pH value of the solution was adjusted to be neutral. Zirconium oxide powder (200 g) was added to the neutralized solution, stirred for 2 hours, and then directly heated to 110° C. to be dried. The dried solid was heated to 450° C. to be sintered for 4 hours, thereby obtaining a catalyst of metal oxide loaded on zirconium oxide ($Fe_{0.8}Co_{0.1}Mn_{0.1}O_z/ZrO_2$), and z was an oxidation coordination number. The metal oxide and zirconium oxide had a weight ratio of 1:2.2.

Preparation Example 6 ($Fe_{0.8}Co_{0.1}Mn_{0.1}O_z/Al_2O_3$)

Iron nitrate (0.4 mol), cobalt nitrate (0.05 mol), and manganese nitrate (0.05 mol) were put into a beaker, and water (200 mL) was added into the beaker and stirred at room temperature to dissolve the salts. The pH value of the solution was adjusted to be neutral. Aluminum oxide powder (200 g) was added to the neutralized solution, stirred for 2 hours, and then directly heated to 110° C. to be dried. The dried solid was heated to 450° C. to be sintered for 4 hours, thereby obtaining a catalyst of metal oxide loaded on aluminum oxide ($Fe_{0.8}Co_{0.1}Mn_{0.1}O_z/Al_2O_3$), and z was an oxidation coordination number. The metal oxide and aluminum oxide had a weight ratio of 1:4.5.

Preparation Example 7 ($Fe_{0.8}Co_{0.1}Mn_{0.1}O_z/TiO_2$)

Iron nitrate (0.2 mol), cobalt nitrate (0.025 mol), and manganese nitrate (0.025 mol) were put into a beaker, and water (200 mL) was added into the beaker and stirred at room temperature to dissolve the salts. The pH value of the solution was adjusted to be neutral. Titanium oxide powder (200 g) was added to the neutralized solution, stirred for 2 hours, and then directly heated to 110° C. to be dried. The dried solid was heated to 450° C. to be sintered for 4 hours, thereby obtaining a catalyst of metal oxide loaded on titanium oxide ($Fe_{0.8}Co_{0.1}Mn_{0.1}O_z/TiO_2$), and z was an oxidation coordination number. The metal oxide and titanium oxide had a weight ratio of 1:9.

Preparation Example 8 ($Fe_{0.8}Co_{0.1}Mn_{0.1}O_z/Zeolite$)

Iron nitrate (0.2 mol), cobalt nitrate (0.025 mol), and manganese nitrate (0.025 mol) were put into a beaker, and water (200 mL) was added into the beaker and stirred at room temperature to dissolve the salts. The pH value of the solution was adjusted to be neutral. Y-type Zeolite powder (200 g) was added to the neutralized solution, stirred for 2 hours, and then directly heated to 110° C. to be dried. The dried solid was heated to 450° C. to be sintered for 4 hours, thereby obtaining a catalyst of metal oxide loaded on zeolite ($Fe_{0.8}Co_{0.1}Mn_{0.1}O_z/Zeolite$), and z was an oxidation coordination number. The metal oxide and zeolite had a weight ratio of 1:9.

Example 5

The catalyst $Fe_{0.8}Co_{0.1}Mn_{0.1}O_z/ZrO_2$ (20-30 mesh, 3 mL) in Preparation Example 5 was filled in a column. Hydrogen and carbon dioxide (GHSV was 800 to 1200 $h^{-1}$) were introduced through the column to contact the catalyst. The column temperature was controlled to continuously react for 60 minutes, and the product composition was then verified by gas chromatography (with the carbonxen-1010 plot column), as shown in Table 2. As shown in Table 2, the $CO_2$ conversion ratio at a low temperature (400° C.) of the catalyst $Fe_{0.8}Co_{0.1}Mn_{0.1}O_z/ZrO_2$ was close to the theoretical value, and the selectivity of CO in the product was very high.

Example 6

Example 6 was similar to Example 5, and the difference in Example 6 was the catalyst being replaced with the catalyst of the metal oxide loaded on aluminum oxide $Fe_{0.8}Co_{0.1}Mn_{0.1}O_z/Al_2O_3$ in Preparation Example 6. The methods of controlling the reaction conditions and analyzing the product were similar to those in Example 5, and the results are shown in Table 2. As shown in Table 2, the $CO_2$ conversion ratio at a low temperature (300° C.) of $Fe_{0.8}Co_{0.1}Mn_{0.1}O_z/Al_2O_3$ was close to the theoretical value, and the selectivity of CO in the product was high.

Example 7

Example 7 was similar to Example 5, and the difference in Example 7 was the catalyst being replaced with the catalyst of the metal oxide loaded on titanium oxide $Fe_{0.8}Co_{0.1}Mn_{0.1}O_z/TiO_2$ in Preparation Example 7. The methods of controlling the reaction conditions and analyzing the product were similar to those in Example 5, and the results are shown in Table 2. As shown in Table 2, the $CO_2$ conversion ratio at a low temperature (400° C.) of $Fe_{0.8}Co_{0.1}Mn_{0.1}O_z/TiO_2$ was close to the theoretical value, and the selectivity of CO in the product was very high. In addition, $Fe_{0.8}Co_{0.1}Mn_{0.1}O_z/TiO_2$ still had a high conversion ratio of $CO_2$ and a very high selectivity of CO in the product under a condition of high temperature and high pressure.

Example 8

Example 8 was similar to Example 5, and the difference in Example 8 was the catalyst being replaced with the catalyst of the metal oxide loaded on zeolite $Fe_{0.8}Co_{0.1}Mn_{0.1}O_z/Zeolite$ in Preparation Example 8. The methods of controlling the reaction conditions and analyzing the product were similar to those in Example 5, and the results are shown in Table 2. As shown in Table 2, the $CO_2$ conversion ratio at a low temperature (300° C.) of $Fe_{0.8}Co_{0.1}Mn_{0.1}O_z/Zeolite$ was close to the theoretical value, and the selectivity of CO in the product was high.

TABLE 2

| | Metal oxide catalyst | $H_2/CO$ | Reaction temperature (° C.) | Reaction pressure (bar) | Theoretical equilibrium conversion ratio (%, based on $CO_2$) | $CO_2$ conversion ratio (%) | Selectivity (%) CO | Selectivity (%) $CH_4$ |
|---|---|---|---|---|---|---|---|---|
| Example 5 | Preparation Example 5 ($Fe_{0.8}Co_{0.1}Mn_{0.1}O_z/ZrO_2$) | 2 | 250 | 1 | 13.4 | 6.5 | 100 | ND |
| | | | 300 | | 19.0 | 16.5 | 100 | ND |
| | | | 350 | | 25.0 | 23.8 | 100 | ND |
| | | | 400 | | 31.1 | 31.0 | 100 | ND |
| Example 6 | Preparation Example 6 ($Fe_{0.8}Co_{0.1}Mn_{0.1}O_z/Al_2O_3$) | 0.25 | 300 | 1 | 6.5 | 6.0 | 99.5 | 0.5 |
| | | 1 | | | 13.6 | 11.4 | 98.3 | 1.7 |
| | | 2 | | | 19.0 | 16.7 | 94.4 | 5.6 |
| Example 7 | Preparation Example 7 ($Fe_{0.8}Co_{0.1}Mn_{0.1}O_z/TiO_2$) | 2 | 300 | 1 | 19.0 | 4.4 | 100 | ND |
| | | | 400 | 1 | 31.1 | 26.1 | 100 | ND |
| | | | 400 | 30 | 31.1 | 29.8 | 100 | ND |
| | | | 500 | 1 | 42.5 | 35.2 | 100 | ND |
| Example 8 | Preparation Example 8 ($Fe_{0.8}Co_{0.1}Mn_{0.1}O_z/Zeolite$) | 4 | 300 | 1 | 26.1 | 26.5 | 94.5 | 5.5 |
| | | | 400 | | 41.7 | 35.2 | 98.1 | 1.9 |

ND: Not detected

Example 9

Example 9 was similar to Example 5, and the difference in Example 9 was the gas hourly space velocity (GHSV) of $H_2/CO$ being changed. The methods of controlling the reaction conditions and analyzing the product were similar to those in Example 5, and the results are shown in Table 3. As shown in Table 3, the $CO_2$ conversion ratio of a higher GHSV was lowered, but the CO production per unit amount of the catalyst of the high GHSV was higher than the CO production per unit amount of the catalyst of the low GHSV (CO/catalyst, kg/kg). The non-converted $CO_2$ and $H_2$ could be introduced through the catalyst column again to be selectively chemically reduced to CO. In addition, the selectivity of CO in the product was very high.

TABLE 3

| Metal oxide catalyst | $H_2/CO$ | Reaction temperature (° C.) | Reaction pressure (bar) | Gas hourly space velocity (GHSV, $h^{-1}$) | Theoretical equilibrium conversion ratio (%, based on $CO_2$) | $CO_2$ conversion ratio (%) | Selectivity (%) CO | Selectivity (%) $CH_4$ |
|---|---|---|---|---|---|---|---|---|
| Preparation Example 5 ($Fe_{0.8}Co_{0.1}Mn_{0.1}O_z/ZrO_2$) | 2 | 400 | 1 | 800 | 31.1 | 26.5 | 100 | ND |
| | | | | 1600 | | 26.0 | 100 | ND |
| | | | | 3200 | | 26.8 | 100 | ND |
| | | | | 6400 | | 25.8 | 100 | ND |
| | | | | 12800 | | 24.7 | 100 | ND |
| | | | | 22400 | | 23.4 | 100 | ND |

ND: Not detected

Example 10

The catalyst $Fe_{0.8}Co_{0.1}Mn_{0.1}O_z/TiO_2$ (20-30 mesh, 100 mL) in Preparation Example 7 was filled in a column. Hydrogen and carbon dioxide (GHSV was 5000 $h^{-1}$) were introduced through the column to contact the catalyst. The column temperature was controlled to continuously react for 60 minutes, and the product composition was then verified by gas chromatography (with the carbonxen-1010 plot column), as shown in Table 4. As shown in Table 4, an $H_2$/CO ratio that is too high or a temperature that is too high would lower the selectivity of CO (e.g. the yield of $CH_4$ was increased).

TABLE 4

| Metal oxide catalyst | $H_2$/CO | Reaction temperature (° C.) | Reaction pressure (bar) | Theoretical equilibrium conversion ratio (%, based on $CO_2$) | $CO_2$ conversion ratio (%) | Product (%) | | | | |
|---|---|---|---|---|---|---|---|---|---|---|
| | | | | | | $CO_2$ | $H_2$ | CO | $H_2O$ | $CH_4$ |
| Preparation Example 7 ($Fe_{0.8}Co_{0.1}Mn_{0.1}O_z$/ $TiO_2$) | 2.0 | 500 | 13.8 | 42.5 | 41.0 | 19.7 | 53.0 | 13.7 | 13.7 | ND |
| | 3.2 | | | 51.2 | 51.9 | 11.5 | 63.8 | 12.2 | 12.4 | ND |
| | 4.0 | | | 55.4 | 55.5 | 8.9 | 68.9 | 11.1 | 11.1 | 0.1 |
| | 5.3 | | | 60.7 | 58.5 | 6.6 | 74.8 | 9.3 | 9.3 | 0.1 |
| | 8.0 | | | 68.2 | 66.2 | 3.8 | 81.5 | 7.4 | 7.4 | 0.2 |
| | 8.0 | 600 | | 78.1 | 75.0 | 2.8 | 79.6 | 8.2 | 8.2 | 1.2 |

ND: Not detected

Example 11

The catalyst $Fe_{0.8}Co_{0.1}Mn_{0.1}O_z/TiO_2$ (20-30 mesh, 100 mL) in Preparation Example 7 was filled in a column. Hydrogen and carbon dioxide (GHSV was 5000 $h^{-1}$) were introduced through the column to contact the catalyst. The column temperature was controlled to continuously react for 60 minutes, and the product composition was then verified by gas chromatography (with the carbonxen-1010 plot column), as shown in Table 5. As shown in Table 5, the product had high selectivity of CO at 400° C. The non-converted $H_2$ could be mixed with $CO_2$ and then introduced through the catalyst column again to form CO.

TABLE 5

| Metal oxide catalyst | $H_2$/CO | Reaction temperature (° C.) | Reaction pressure (bar) | Theoretical equilibrium conversion ratio (%, based on $CO_2$) | $CO_2$ conversion ratio (%) | Product (%) | | | | |
|---|---|---|---|---|---|---|---|---|---|---|
| | | | | | | $CO_2$ | $H_2$ | CO | $H_2O$ | $CH_4$ |
| Preparation Example 7 ($Fe_{0.8}Co_{0.1}Mn_{0.1}O_z$/ $TiO_2$) | 2.0 | 400 | 13.8 | 31.1 | 31 | 23.0 | 56.3 | 10.3 | 10.3 | ND |
| | 3.2 | | | 38.1 | 36.6 | 15.1 | 67.5 | 8.7 | 8.7 | ND |
| | 4.0 | | | 41.7 | 41.5 | 11.7 | 71.7 | 8.3 | 8.3 | ND |
| | 5.3 | | | 46.4 | 46.5 | 8.5 | 76.7 | 7.4 | 7.4 | ND |
| | 8.0 | | | 53.7 | 52.7 | 5.3 | 83.0 | 5.9 | 5.9 | ND |
| | 16.0 | | | 65.9 | 65.7 | 2.0 | 90.3 | 3.9 | 3.9 | ND |

ND: Not detected

It will be apparent to those skilled in the art that various modifications and variations can be made to the disclosed methods and materials. It is intended that the specification and examples be considered as exemplary only, with the true scope of the disclosure being indicated by the following claims and their equivalents.

What is claimed is:

1. A method for selectively chemically reducing $CO_2$ to form CO, comprising:
   providing a catalyst; and
   contacting $H_2$ and $CO_2$ with the catalyst to chemically reduce $CO_2$ to form CO,
   wherein the catalyst comprises a metal oxide having a chemical formula of $Fe_xCo_yMn_{(1-x-y)}O_z$,
   wherein 0.7≤0.95, 0.01≤y≤0.25, and z is an oxidation coordination number.

2. The method as claimed in claim 1, wherein the step of contacting $H_2$ and $CO_2$ with the catalyst is performed at a temperature of 200° C. to 500° C.

3. The method as claimed in claim 1, wherein the step of contacting $H_2$ and $CO_2$ with the catalyst is performed at a pressure of 1 bar to 40 bar.

4. The method as claimed in claim 1, wherein $H_2$ and $CO_2$ have a molar ratio of 16:1 to 1:4.

* * * * *